United States Patent
Aono et al.

(10) Patent No.: US 11,935,339 B2
(45) Date of Patent: Mar. 19, 2024

(54) VEHICLE INSPECTION SYSTEM AND VEHICLE INSPECTION METHOD

(71) Applicant: HONDA MOTOR CO., LTD., Tokyo (JP)

(72) Inventors: Kento Aono, Tochigi-ken (JP); Tatsuya Jitsui, Tochigi-ken (JP); Kenichiro Kurai, Tochigi-ken (JP); Yuichi Fukuda, Tochigi-ken (JP); Yasushi Watanabe, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

(21) Appl. No.: 17/277,309

(22) PCT Filed: Sep. 10, 2019

(86) PCT No.: PCT/JP2019/035475
§ 371 (c)(1),
(2) Date: Mar. 18, 2021

(87) PCT Pub. No.: WO2020/059570
PCT Pub. Date: Mar. 26, 2020

(65) Prior Publication Data
US 2021/0287460 A1  Sep. 16, 2021

(30) Foreign Application Priority Data

Sep. 21, 2018 (JP) ................. 2018-177995

(51) Int. Cl.
*G07C 5/08* (2006.01)
*G07C 5/00* (2006.01)

(52) U.S. Cl.
CPC ........... *G07C 5/0825* (2013.01); *G07C 5/008* (2013.01)

(58) Field of Classification Search
CPC .. G07C 5/0825; G07C 5/008; G01M 17/0074
See application file for complete search history.

(56) References Cited

U.S. PATENT DOCUMENTS 5,844,145 A * 12/1998 D'Angelo ......... G01M 17/0072
73/862.17
10,502,656 B1 * 12/2019 Magee ................ G01M 17/007
(Continued)

FOREIGN PATENT DOCUMENTS

JP    2007-078477    3/2007
JP    2008-197023    8/2008
(Continued)

OTHER PUBLICATIONS

Chinese Office Action and Search Report for Chinese Patent Application No. 201980061731.8 dated Oct. 10, 2022.
(Continued)

*Primary Examiner* — Adam R Mott
*Assistant Examiner* — Erick T. Detweiler
(74) *Attorney, Agent, or Firm* — Amin, Turocy & Watson, LLP

(57) ABSTRACT

Provided are a vehicle inspection system and a vehicle inspection method that can align a vehicle with a constant location of a bench testing machine. The present invention comprises: a bench testing machine that rotatably supports wheels of a vehicle, using rollers that are provided for each of the wheels; and a monitor device that is positioned in a fixed location with regard to the bench testing machine and displays, toward a camera, an image resembling an exterior environment, wherein the bench testing machine has a location adjustment device (turning mechanism, test bench control device) that adjusts the location of the vehicle in the (Continued)

vehicle width direction such that the relative location of the camera in the vehicle width direction with regard to the monitor device is constant.

7 Claims, 8 Drawing Sheets

(56) References Cited

U.S. PATENT DOCUMENTS

| | | |
|---|---|---|
| 2015/0149031 A1 | 5/2015 | Pfister |
| 2017/0017847 A1* | 1/2017 | Nakaya ............... H04N 9/3147 |
| 2018/0030667 A1 | 10/2018 | Kaneko et al. |
| 2018/0306674 A1 | 10/2018 | Kaneko et al. |

FOREIGN PATENT DOCUMENTS

| | | |
|---|---|---|
| JP | 2009-025010 | 2/2009 |
| JP | 5088740 B2 * | 12/2012 |
| JP | 2015-520854 | 7/2015 |
| JP | 2015-200586 | 11/2015 |
| JP | 2017-075856 | 4/2017 |
| JP | 2018-096958 | 6/2018 |

OTHER PUBLICATIONS

International Search Report and Written Opinion for International Application No. PCT/JP2019/035475 dated Nov. 12, 2019, 7 pages.

* cited by examiner

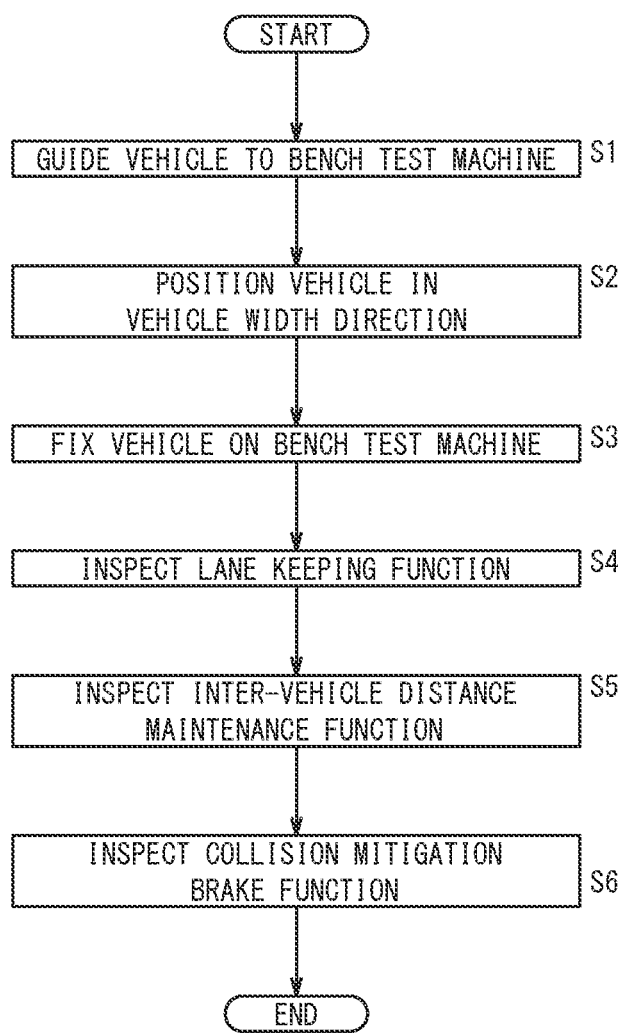

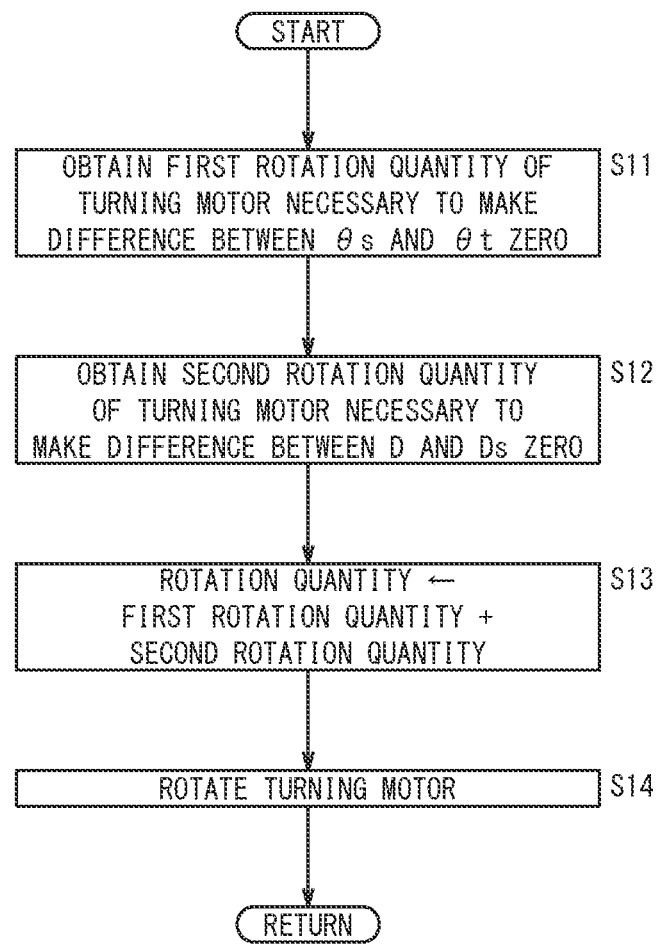

VEHICLE INSPECTION SYSTEM AND VEHICLE INSPECTION METHOD

TECHNICAL FIELD

The present invention relates to a vehicle inspection system and a vehicle inspection method for inspecting operation of a vehicle that performs travel control on the basis of external environment information detected by a camera.

BACKGROUND ART

Japanese Laid-Open Patent Publication No. 2018-096958 discloses a system in which a driving function of a vehicle that performs automated driving with the use of a camera, a radar, a LiDAR, and a GPS receiver is inspected indoors. In this system, the automated driving function (driving assistance function) is inspected with the vehicle mounted on a bench test machine. For example, the system checks whether the vehicle travels properly to a destination in a state where the destination is set in a navigation device of the vehicle by transmitting a quasi-signal indicating a vehicle position to the GPS receiver. Moreover, the system checks whether the vehicle brakes properly by causing the camera of the vehicle to photograph a quasi-traffic signal while the vehicle is in a traveling state.

SUMMARY OF INVENTION

In order to perform the accurate inspection using the bench test machine as disclosed in Japanese Laid-Open Patent Publication No. 2018-096958, it is preferable that a wheel is placed on a substantial center of a roller in an axial direction thereof. Therefore, when the vehicle is advanced onto the bench test machine, an operator needs to drive carefully for positioning the vehicle in place.

The present invention has been made in view of such a circumstance, and an object of the present invention is to provide a vehicle inspection system and a vehicle inspection method that can position a vehicle to a constant position on a bench test machine.

A first aspect of the present invention is a vehicle inspection system configured to inspect operation of a vehicle that performs travel control on the basis of external environment information detected by a camera, the vehicle inspection system including: a bench test machine configured to rotatably support wheels of the vehicle by rollers provided for each wheel; and a display device disposed at a fixed position with respect to the bench test machine, and configured to display an image simulating an external environment toward the camera, wherein the bench test machine includes a position adjustment device configured to adjust a position of the vehicle in a vehicle width direction so that a relative position of the camera relative to the display device in the vehicle width direction becomes constant.

A second aspect of the present invention is a vehicle inspection method for inspecting operation of a vehicle that performs travel control on the basis of external environment information detected by a camera, the vehicle inspection method including: guiding the vehicle to a bench test machine including rollers; and with a position adjustment device, turning or laterally moving the rollers so that a relative position of the camera relative to a display device in a vehicle width direction becomes constant, in order to display an image simulating an external environment toward the camera, the display device being disposed at a fixed position with respect to the bench test machine.

According to the present invention, the position adjustment device can adjust the position of the vehicle in the vehicle width direction, and thus the vehicle can be positioned at a constant position on the bench test machine.

BRIEF DESCRIPTION OF DRAWINGS

FIG. 4 is a flowchart illustrating a procedure of inspecting the vehicle;

FIG. 8 is a flowchart illustrating a procedure of a process for adjusting a vehicle position in a third embodiment.

DESCRIPTION OF EMBODIMENTS

Preferred embodiments of a vehicle inspection system and a vehicle inspection method according to the present invention are hereinafter described in detail with reference to the attached drawings.

1. First Embodiment

[1.1. Vehicle 200]

Figure 1:
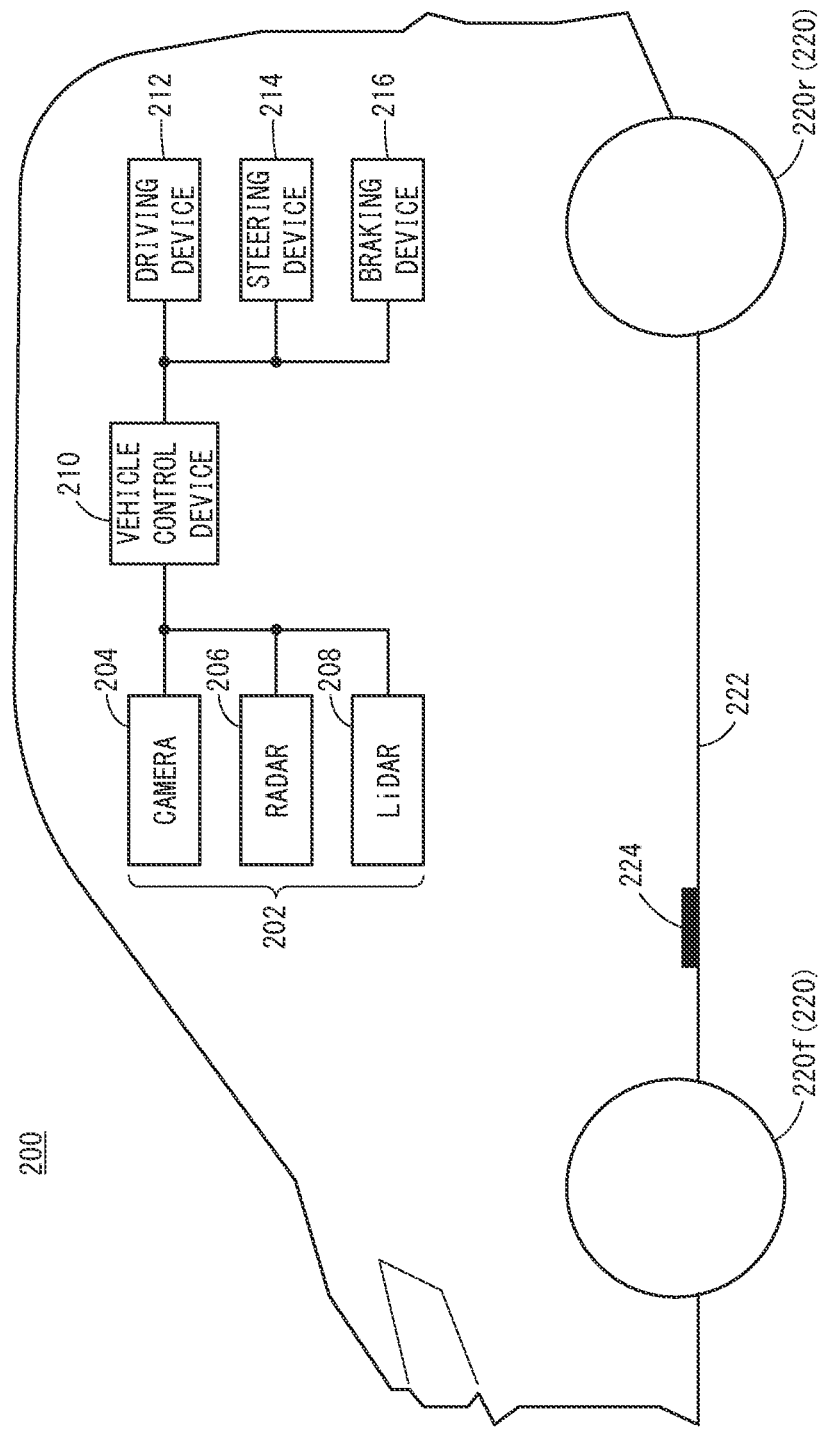
FIG. 1 is a device structure diagram of a vehicle to be inspected in a first embodiment.

A vehicle 200 to be inspected in the present embodiment is described with reference to FIG. 1. Here, it is assumed that the vehicle 200 is a driving assistance vehicle capable of automatic control of at least one of acceleration/deceleration, braking, and steering on the basis of detection information from external environment sensors 202. Note that the vehicle 200 may be an automated driving vehicle (including fully automated driving vehicle) capable of the automatic control of the acceleration/deceleration, the braking, and the steering on the basis of the detection information from the external environment sensors 202 and positional information of GNSS (not illustrated). As illustrated in FIG. 1, the vehicle 200 includes the external environment sensors 202 that detect external environment information, a vehicle control device 210 that performs travel control of the vehicle 200, a driving device 212, a steering device 214, and a braking device 216 that operate in accordance with an operation instruction output from the vehicle control device 210, and each wheel 220.

The external environment sensors 202 include one or more cameras 204, one or more radars 206, and one or more LiDARs 208 for detecting the external environment information ahead of the vehicle 200. The camera 204 photographs an external environment ahead of the vehicle 200. The radar 206 emits an electric wave ahead of the vehicle 200, and detects a reflection wave reflected in the external environment. The LiDAR 208 emits laser light ahead of the vehicle 200, and detects scattering light scattering in the external environment. Note that the description about the external environment sensor that detects the external environment information other than the information about the environment ahead of the vehicle 200 is omitted.

The vehicle control device 210 is formed by a vehicle control ECU. On the basis of image information from the camera 204 and the detection information from the radar 206 and the LiDAR 208, the vehicle control device 210 calculates the optimum acceleration/deceleration, braking quantity, and steering angle in accordance with various kinds of driving assistance functions (for example, lane keeping function, inter-vehicle distance maintenance function, collision mitigation brake function, etc.), and outputs the operation instruction to various kinds of control target devices.

The driving device 212 includes a driving ECU, and a driving source such as an engine or a traction motor. The driving device 212 generates the driving force for the wheels 220 in accordance with the occupant's operation on an accelerator pedal or the operation instruction output from the vehicle control device 210. The steering device 214 includes an electric power steering system (EPS) ECU and an EPS actuator. The steering device 214 changes a steering angle θs of the wheels 220 (front wheels 220f) in accordance with the occupant's operation of a steering wheel or the operation instruction output from the vehicle control device 210. The braking device 216 includes a brake ECU and a brake actuator. The braking device 216 generates the braking force for the wheels 220 in accordance with the occupant's operation on a brake pedal or the operation instruction output from the vehicle control device 210.

On a bottom surface 222 of the vehicle 200, a jack-up point 224 exists.

[1.2. Vehicle Inspection System 10]

A vehicle inspection system 10 that inspects operation of the vehicle 200 is described with reference to FIG. 2. The vehicle inspection system 10 includes a bench test machine 20, a simulator device 80, a monitor device (display device) 90, a target device 100, and an analysis device 110.

[1.2.1. Bench Test Machine 20]

Figure 2:
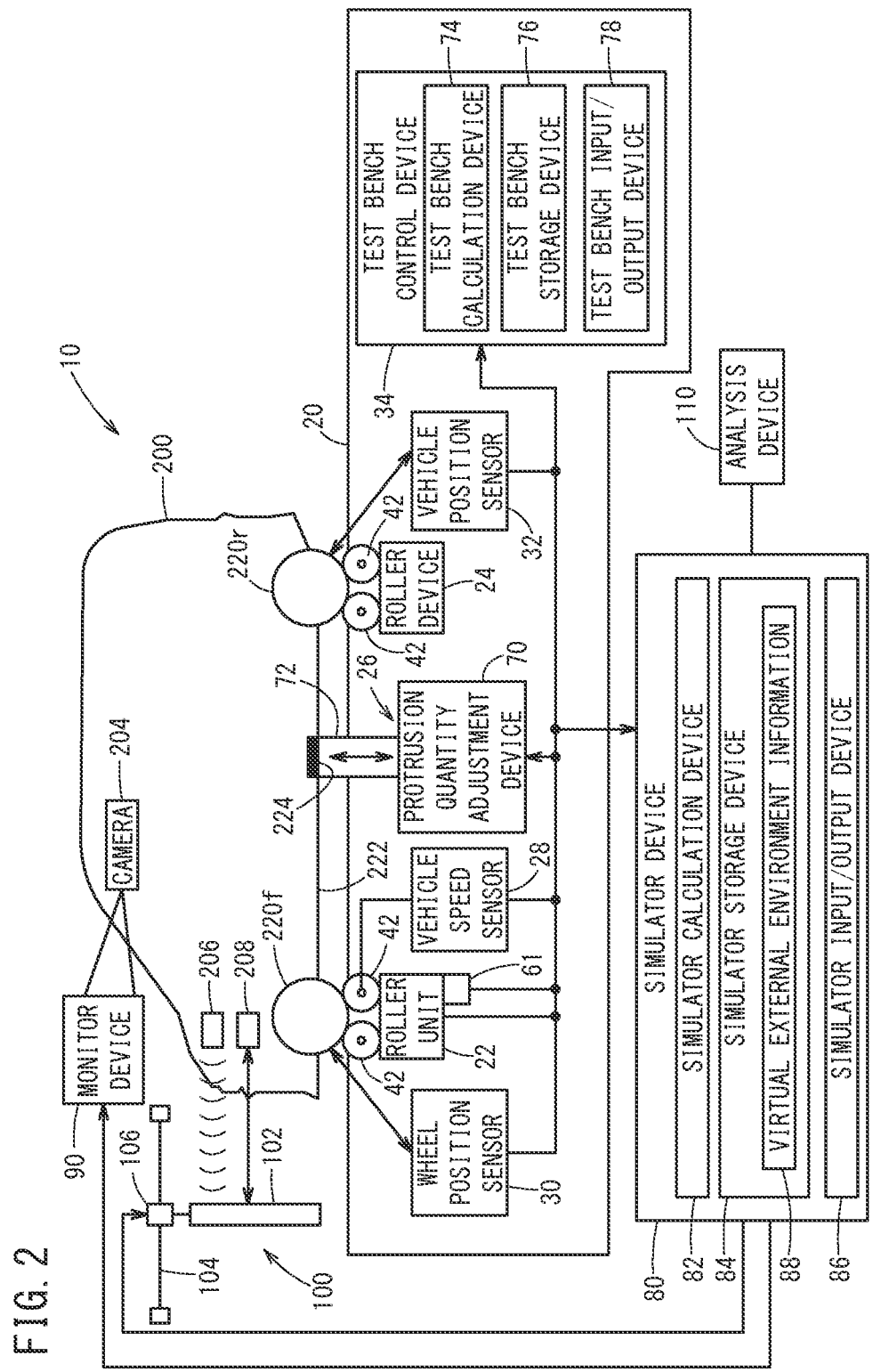
FIG. 2 is a system structure diagram of a vehicle inspection system according to the first embodiment.

As illustrated in FIG. 2, the bench test machine 20 includes a roller unit 22, a roller device 24, a movement restriction device 26, a vehicle speed sensor 28, a wheel position sensor 30, a vehicle position sensor 32, and a test bench control device 34. The bench test machine 20 for inspecting the vehicle 200 whose front wheels 220f are drive wheels and steered wheels is described below.

Figure 3:
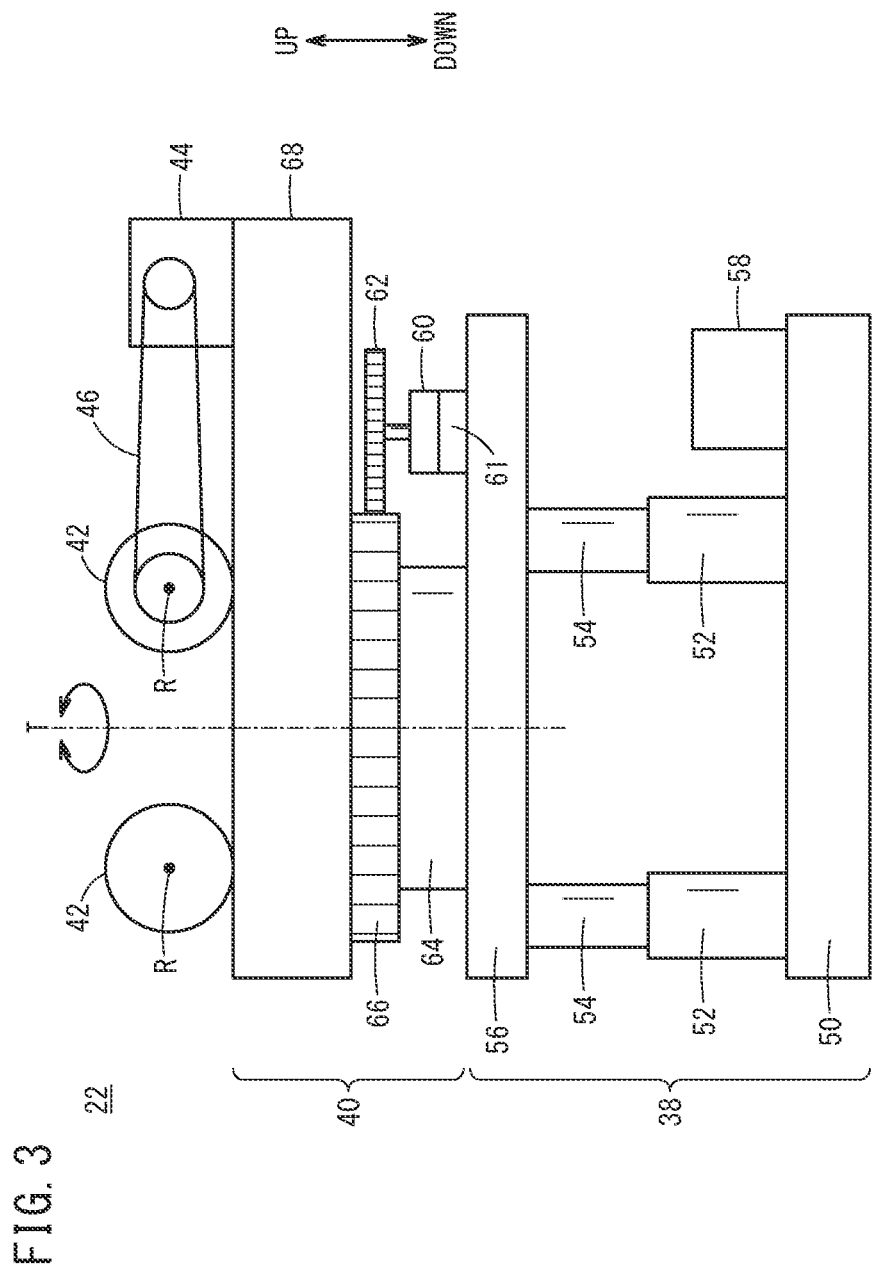
FIG. 3 is a schematic diagram of a roller unit.

The roller unit 22 is a mechanism that is provided below the front wheel 220f of the vehicle 200 placed on the bench test machine 20, and rotatably and turnably supports the front wheel 220f. As illustrated in FIG. 3, the roller unit 22 includes a lifting mechanism 38, a turning mechanism 40, and two rollers 42. The roller unit 22 can turn the two rollers 42 around a turning axis T, which is parallel to an up and down direction, so as to follow up steering operation of the front wheel 220f, and moreover can lift the two rollers 42 in the up and down direction.

The lifting mechanism 38 includes a base 50, a plurality of cylinders 52, a plurality of pistons 54, a lifting board 56, and a height adjustment device 58. The base 50 is positioned at a lowermost part of the roller unit 22, and is fixed to a main body of the bench test machine 20. The cylinder 52 is a fluid pressure cylinder (pneumatic cylinder or hydraulic cylinder) and is fixed to the base 50. The piston 54 goes up in an up direction when a fluid is supplied to the cylinder 52, and goes down in a down direction when the fluid is discharged from the cylinder 52. The lifting board 56 is supported by the pistons 54 from below, and goes up and down in accordance with the operation of the pistons 54. The height adjustment device 58 is a device (for example, pump, pipe, or solenoid valve) that supplies the fluid to the cylinder 52 and discharges the fluid from the cylinder 52. The solenoid valve of the height adjustment device 58 operates in accordance with a pilot signal output from the test bench control device 34. The supplying and discharging of the fluid to and from the cylinder 52 are switched in accordance with the operation of the solenoid valve. Note that the lifting mechanism 38 may be operated by an electric motor instead of by fluid pressure. Note that the supporting by the piston 54 may be assisted by a stopper that is not illustrated.

The turning mechanism 40 includes a turning motor 60, a rotation sensor 61, a first gear 62, a supporting board 64, a second gear 66, and a turning table 68. The turning motor 60 is fixed to the lifting board 56. The rotation sensor 61 and the first gear 62 are fixed to an output shaft of the turning motor 60. The turning motor 60 operates with electric power supplied from the test bench control device 34. The rotation sensor 61 is formed by, for example, a rotary encoder. The rotation sensor 61 detects a rotation position θp of the turning motor 60. The rotation position θp corresponds to a turning angle θt of the rollers 42 (turning table 68). The supporting board 64 is fixed to an upper surface of the lifting board 56. The second gear 66 is supported by the supporting board 64 so as to be rotatable around the turning axis T that is parallel to the up and down direction. In addition, teeth formed on a circumferential surface of the second gear 66 mesh with teeth formed on a circumferential surface of the first gear 62. The turning table 68 is attached to an upper surface of the second gear 66, and turns around the turning axis T together with the rotation of the second gear 66.

The two rollers 42 are supported by the turning table 68 in a state of being rotatable around a rotation axis R, which is parallel to a horizontal plane. One of the two rollers 42 is in contact with a lower front surface of the front wheel 220f and the other thereof is in contact with a lower rear surface of the front wheel 220f; thus, the front wheel 220f is rotatably supported. When the steering angle θs of the front wheel 220f is zero, the axial direction of the two rollers 42 is parallel to a vehicle width direction. One of the two rollers 42 is connected to an output shaft of a torque motor 44 through a belt 46. The torque motor 44 can apply a virtual load on the wheel 220 by applying, to the rollers 42, a torque around the rotation axis R. The torque motor 44 operates with electric power supplied from the test bench control device 34.

Back to FIG. 2, the description of the bench test machine 20 is continued. The roller device 24 is a mechanism that is provided below a rear wheel 220r of the vehicle 200 placed on the bench test machine 20, and rotatably supports the rear wheel 220r. The roller device 24 includes two rollers 42. The two rollers 42 are supported so as to be rotatable around the rotation axis R, which is parallel to the axial direction.

The movement restriction device 26 is a mechanism that is disposed below the vehicle 200 in a state of being placed on the bench test machine 20, and restricts the movement of the vehicle 200 in the vehicle width direction. The movement restriction device 26 includes a convex part 72 and a protrusion quantity adjustment device 70. The convex part 72 is a piston itself or a member connected to the piston, which makes contact with the jack-up point 224. The protrusion quantity adjustment device 70 is a fluid pressure cylinder, a fluid pressure pump, a pipe, a solenoid valve, and the like, for operating the piston. Alternatively, the convex part 72 may be a rack itself or a member connected to the rack, and the protrusion quantity adjustment device 70 may be a pinion, an electric motor, or the like, for operating the rack. The movement restriction device 26 changes the upward protrusion quantity of the convex part 72 by the operation of the protrusion quantity adjustment device 70. The protrusion quantity adjustment device 70 operates in accordance with an operation instruction output from the test bench control device 34. In a state where the front wheel 220f is placed on the roller unit 22 and the rear wheel 220r is placed on the roller device 24, the convex part 72 is placed right below the jack-up point 224. Note that when the vehicle 200 is advanced onto the bench test machine 20, the convex part 72 is housed lower than an upper surface of the bench test machine 20.

The vehicle speed sensor 28 is formed by, for example, a rotary encoder or a resolver. The vehicle speed sensor 28 detects rotation speed r1 of any of the rollers 42 in the roller unit 22. The rotation speed r1 corresponds to vehicle speed V. The wheel position sensor 30 is formed by a laser ranging device or the like. The wheel position sensor 30 detects a distance d from the wheel position sensor 30 to a predetermined portion of the front wheel 220f. The distance d corresponds to the steering angle θs of the vehicle 200. The vehicle position sensor 32 is formed by a laser ranging device or the like. The vehicle position sensor 32 detects a distance D from the vehicle position sensor 32 to a predetermined portion (side portion) of the vehicle 200. The distance D corresponds to a position of the vehicle 200 in the vehicle width direction.

The test bench control device 34 is formed by a computer, and includes a test bench calculation device 74, a test bench storage device 76, and a test bench input/output device 78. The test bench calculation device 74 is formed by a processor such as a CPU. The test bench calculation device 74 controls the height adjustment device 58, the turning motor 60, and the torque motor 44 in the roller unit 22 by executing programs stored in the test bench storage device 76. The test bench storage device 76 is formed by a ROM, a RAM, a hard disk, and the like. The test bench input/output device 78 includes an A/D conversion circuit, a communication interface, a driver, and the like.

[1.2.2. Simulator Device 80]

In a manner similar to the test bench control device 34, the simulator device 80 is formed by a computer, and includes a simulator calculation device 82, a simulator storage device 84, and a simulator input/output device 86. The simulator calculation device 82 is formed by a processor such as a CPU. The simulator calculation device 82 executes programs stored in the simulator storage device 84 so as to output image information about a virtual external environment to the monitor device 90. The simulator storage device 84 is formed by a ROM, a RAM, a hard disk, and the like. The simulator storage device 84 stores programs that are executed by the simulator calculation device 82, and virtual external environment information 88 simulating the external environment information. The virtual external environment information 88 is information to reproduce a series of virtual external environments, and the information about the initial position of the vehicle 200 in the virtual external environment, the position of each object in the virtual external environment, the behavior of the moving object, or the like is set in advance. The simulator input/output device 86 includes an A/D conversion circuit, a communication interface, a driver, and the like.

[1.2.3. Monitor Device 90]

The monitor device 90 is fixed at a constant position with respect to the bench test machine 20. That is to say, the monitor device 90 is disposed at a fixed position with respect to the bench test machine 20. The constant position and the fixed position refer to a position where, when each wheel 220 of the vehicle 200 is placed at the center of the corresponding rollers 42 in the axial direction thereof (vehicle width direction), the monitor device 90 faces the front of the camera 204 and the photographing range of the camera 204 falls within the screen of the monitor device 90. Note that the position of the monitor device 90 in the up-down direction may be variable while the position thereof in the left-right direction (vehicle width direction) is fixed. In this case, after the vehicle 200 advances to the bench test machine 20, the position of the monitor device 90 is adjusted in the up-down direction.

[1.2.4. Target Device 100]

The target device 100 is disposed to face the radar 206 and the LiDAR 208. The target device 100 includes a target 102, a guide rail 104, and an electric motor 106. The target 102 is a plate material simulating a preceding vehicle 124 (FIG. 6B), for example. By the operation of the electric motor 106, the target 102 can be moved in a direction of approaching or separating from the front side of the vehicle 200 along the guide rail 104. The electric motor 106 operates in accordance with the electric power output from the simulator device 80.

Note that the radar 206 and the LiDAR 208 may detect a virtual target instead of detecting the target 102 representing the preceding vehicle 124. In this case, the electric wave from the radar 206 and the laser light from the LiDAR 208 may be absorbed and a quasi-reflection wave may be delivered to the radar 206 and the LiDAR 208 at the timing in accordance with the distance to the virtual preceding vehicle 124.

[1.2.5. Analysis Device 110] The analysis device 110 is formed by a computer including a processor, a storage device, and an input/output device. The analysis device 110 acquires a data log of the inspection from the simulator device 80 or the bench test machine 20, here the information in time series about the vehicle speed V and the steering angle θs of the vehicle 200.

[1.3. Operation Inspection Procedure of Vehicle 200 and Operation of Each Part]

With reference to FIG. 4, the procedure of the operation inspection of the vehicle 200 using the vehicle inspection system 10 and the operation of each part are described. The inspection is performed in the order of step S1 to step S6 in FIG. 4. Here, it is assumed that the lane keeping function, the inter-vehicle distance maintenance function, and the collision mitigation brake function are inspected. The following inspection is performed with an operator in the vehicle 200.

In step S1, the vehicle 200 is guided to the bench test machine 20. Here, the front wheel 220f is placed on the rollers 42 in the roller unit 22, and the rear wheel 220r is placed on the rollers 42 in the roller device 24.

Figure 5A:
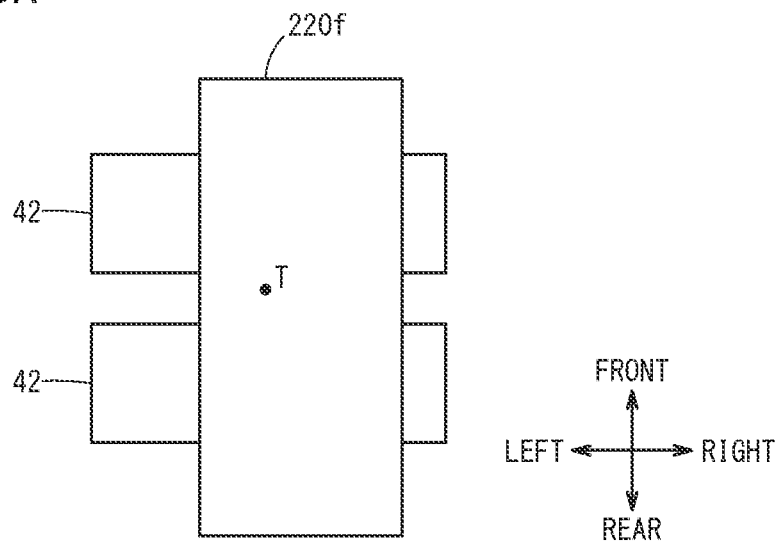
FIG. 5A and FIG. 5B are diagrams for describing positioning of a front wheel.

In step S2, positioning of the vehicle 200 in the vehicle width direction is performed. In the present embodiment, the operation of the vehicle 200 is inspected in a state where each wheel 220 is placed at the center of the corresponding roller 42 in the axial direction (vehicle width direction). As such, it is necessary to place each wheel 220 at a correct position, for example at the center of each roller 42 in the axial direction thereof (hereinafter this position will be also simply referred to as "center of rollers 42") before the vehicle 200 is caused to travel on the bench test machine 20. Here, description will be given of a method in which, assuming that the front wheel 220f of the vehicle 200 is displaced to the right with respect to the roller unit 22, the position of the front wheel 220f is adjusted to the center of the rollers 42 as illustrated in FIG. 5A.

The test bench storage device 76 stores in advance a distance Ds from the vehicle position sensor 32 to a predetermined portion of the front wheel 220f and a threshold Dth corresponding to allowable deviation in an initial state (a state where the front wheel 220f is at the center of the rollers 42 and the steering angle θs is zero). The test bench calculation device 74 compares the latest distance D detected by the vehicle position sensor 32 with the distance Ds, and keeps operating the turning motor 60 of the roller unit 22 until the difference between the both (=|D−Ds|) becomes the threshold Dth or less, preferably until the both coincide with each other. At this time, the test bench input/output device 78 outputs an electric power determined by the test bench calculation device 74.

Figure 5B:
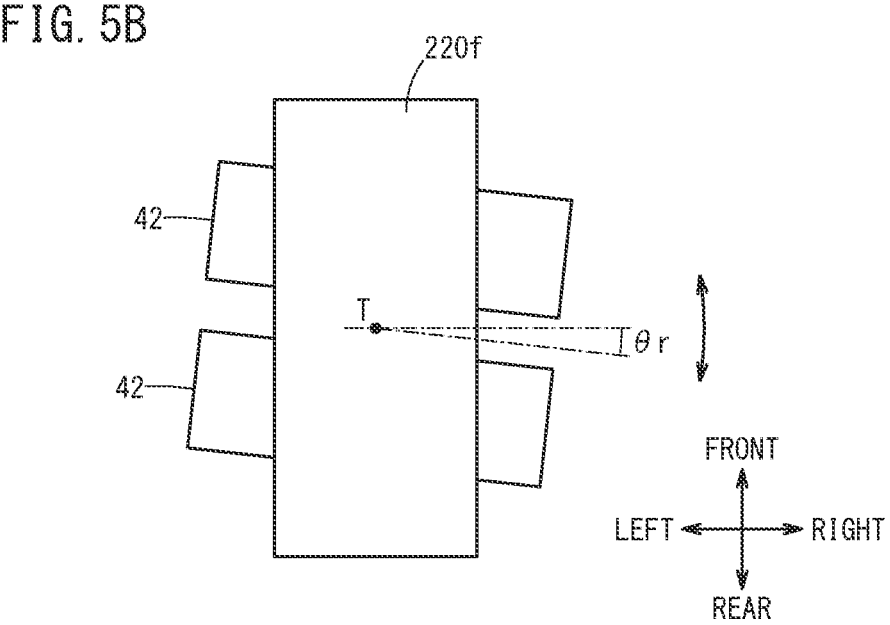

The turning motor 60 receives the electric power output from the test bench input/output device 78, and repeats rotation of a predetermined angle in a positive direction and a negative direction. Then, as illustrated in FIG. 5B, the rollers 42 of the roller unit 22 are turned around the turning axis T alternately in the positive direction and the negative direction by a predetermined angle θr with a reference posture (a posture at which the axial direction of the rollers 42 coincides with the vehicle width direction) as a starting point. As the rollers 42 are turned, a reaction force occurs in the front wheel 220f in a direction of the turning axis T. Then, the front wheel 220f moves to the center of the rollers 42 (in this case, to the left) by the reaction force with the steering angle θs remaining unchanged. Moreover, the vehicle 200 moves to the center of the bench test machine 20 (in this case, to the left). The turning operation of the rollers 42 is repeated and when the difference between the distance D and the distance Ds becomes the threshold Dth or less, the test bench calculation device 74 stops the operation of the turning motor 60. At this time, the test bench input/output device 78 stops the output of control electric power. The rollers 42 stop at a position where the rollers 42 are orthogonal to the front wheel 220f.

The method in which the front wheel 220f that is shifted to the right is moved to the center of the rollers 42 has been described with reference to FIG. 5A and FIG. 5B. Similarly, the front wheel 220f that is shifted to the left can be moved to the center of the rollers 42. At this time, the camera 204 and the monitor device 90 may be disposed to face each other by slightly displacing the image in the left-right direction, instead of moving the monitor device 90 in the left-right direction.

In step S3, the vehicle 200 is fixed onto the bench test machine 20. In a state where positioning of the vehicle 200 in the vehicle width direction has been completed in step S2, the convex part 72 of the movement restriction device 26 is positioned right below the jack-up point 224 of the vehicle 200. The test bench calculation device 74 operates the movement restriction device 26 and the height adjustment device 58 of the roller unit 22 in a state where the difference between the distance D and the distance Ds is the threshold Dth or less. At this time, the test bench input/output device 78 outputs a pilot signal to the movement restriction device 26 and the height adjustment device 58.

The protrusion quantity adjustment device 70 lifts up the convex part 72 in accordance with the pilot signal output from the test bench input/output device 78. The convex part 72 is brought into contact with the jack-up point 224 of the vehicle 200.

The height adjustment device 58 operates the solenoid valve in accordance with the pilot signal output from the test bench input/output device 78, so that fluid is discharged from the cylinder 52. Then, the rollers 42 of the roller unit 22 go down and the front wheel 220f goes down accordingly. At this time, since the convex part 72 of the movement restriction device 26 is in contact with the jack-up point 224 of the vehicle 200, the suspension of the vehicle 200 is extended and only the front wheel 220f goes down. As a result, the movement of the vehicle 200 in the vehicle width direction and a front-rear direction is restricted, and the vehicle 200 is secured on the bench test machine 20. At this time, the vertical positions of the monitor device 90 and the camera 204 remain unchanged.

Figure 6A:
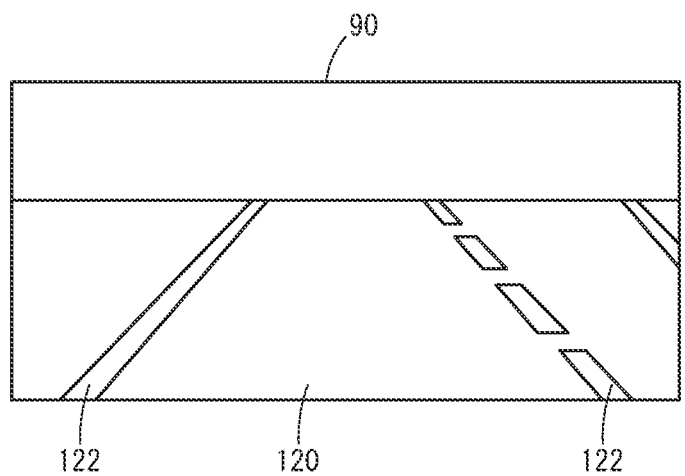
FIG. 6A, FIG. 6B, and FIG. 6C are diagrams for describing a virtual external environment displayed on a monitor device.

In step S4, the lane keeping function is inspected. In the inspection of the lane keeping function, the simulator device 80 reproduces the virtual external environment showing a scene without any obstacle (FIG. 6A). The simulator calculation device 82 reproduces a traveling scene without any obstacle on the basis of the virtual external environment information 88, and causes the monitor device 90 to display an image of the reproduced scene. As illustrated in FIG. 6A, the monitor device 90 displays, as the virtual external environment, a driving lane 120 where left and right compartment lines 122 are provided. The camera 204 in the vehicle 200 photographs the image displayed on the monitor device 90. On the other hand, the radar 206 and the LiDAR 208 are covered with an electromagnetic wave absorber (not illustrated), and the virtual external environment without any obstacle, that is, an environment without reflection of the electromagnetic wave is reproduced.

The operator operates in advance a switch provided to the vehicle 200 so as to activate the lane keeping function. The vehicle control device 210 performs acceleration/deceleration control in accordance with the operator's operation on the accelerator pedal or the brake pedal, and additionally performs steering control so that the vehicle 200 travels at the center of the driving lane 120 on the basis of a detection result from the external environment sensors 202.

The simulator calculation device 82 calculates the movement quantity and the direction of the vehicle 200 on the basis of the vehicle speed V detected by the vehicle speed sensor 28 and the steering angle θs detected by the wheel position sensor 30. Then, the simulator calculation device 82 changes the position of the vehicle 200 in the virtual external environment in accordance with the calculated movement quantity and direction, and reproduces the virtual external environment around the changed position. The monitor device 90 displays the image of the latest virtual external environment reproduced by the simulator calculation device 82. As a result, the image displayed on the monitor device 90 is synchronized with the operation of the vehicle 200. Similarly, in the inspection in step S5 and step S6 to be described below, the simulator calculation device 82 causes the monitor device 90 to display the image in synchronization with the operation of the vehicle 200.

The test bench control device 34 operates the turning motor 60 of the roller unit 22 on the basis of the steering angle θs detected by the wheel position sensor 30 in order to turn the rollers 42 in the roller unit 22 so as to follow up the steering of the front wheel 220f. At this time, the test bench calculation device 74 controls (performs feedback control of) the turning motor 60 so that the turning angle θt detected by the rotation sensor 61 follows up the steering angle θs detected by the wheel position sensor 30. Thus, the test bench control device 34 keeps the rollers 42 orthogonal to the front wheel 220f (i.e., keeping the rotation axis R of the rollers 42 parallel to the axle of the front wheel 220f). Similarly in the inspection in step S5 and step S6 to be described below, the test bench control device 34 operates the turning motor 60 of the roller unit 22. In addition, at this time, the convex part 72 is in contact with the jack-up point 224, so that the vehicle 200 is supported and firmly positioned in place. Thus, the relative position between the monitor device 90 and the camera 204 is held, and the camera 204 is always face-to-face with the monitor device 90.

Figure 6B:
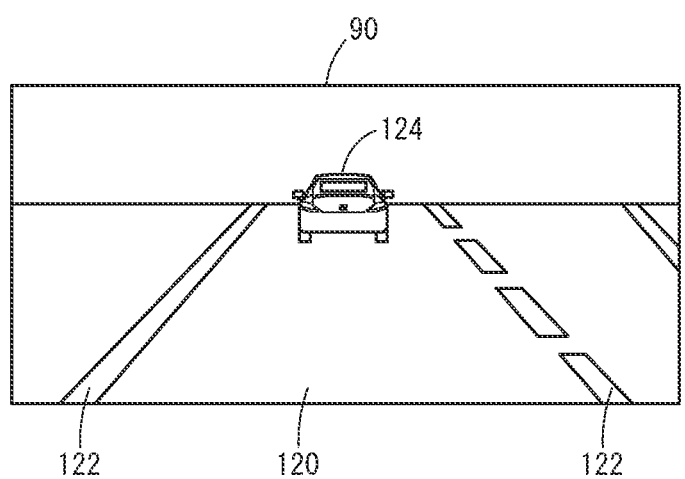

In step S5, the inter-vehicle distance maintenance function is inspected. In the inspection of the inter-vehicle distance maintenance function, the simulator device 80 reproduces the virtual external environment showing a scene where the preceding vehicle 124 travels (FIG. 6B). The simulator calculation device 82 reproduces the scene where the preceding vehicle 124 travels, on the basis of the virtual external environment information 88, and causes the monitor device 90 to display the image of the reproduced scene. As illustrated in FIG. 6B, the monitor device 90 displays, as the virtual external environment, the preceding vehicle 124 traveling a predetermined distance ahead of the virtual traveling position of the vehicle 200 together with the driving lane 120. The camera 204 of the vehicle 200 photographs the image displayed on the monitor device 90.

In addition, the simulator calculation device 82 controls the operation of the electric motor 106 such that the position of the target 102 coincides with the position of the preceding vehicle 124 in the virtual external environment information 88. The electric motor 106 of the target device 100 operates with electric power output from the simulator input/output device 86, and moves the target 102 to the position of the preceding vehicle 124 in the virtual external environment. The radar 206 and the LiDAR 208 of the vehicle 200 detect the target 102.

The operator operates in advance a switch provided to the vehicle 200 so as to activate the inter-vehicle distance maintenance function. The vehicle control device 210 performs the steering control in accordance with the operator's operation of the steering wheel, and additionally performs the acceleration/deceleration control such that the vehicle 200 travels while maintaining the inter-vehicle distance between the vehicle 200 and the preceding vehicle 124 on the basis of the detection result from the external environment sensors 202. In addition, at this time, the convex part 72 is in contact with the jack-up point 224, whereby the vehicle 200 is supported and secured in place. Thus, the relative position between the monitor device 90 and the camera 204 in the vehicle width direction is held, and the camera 204 is always positioned right in front of the monitor device 90.

Figure 6C:
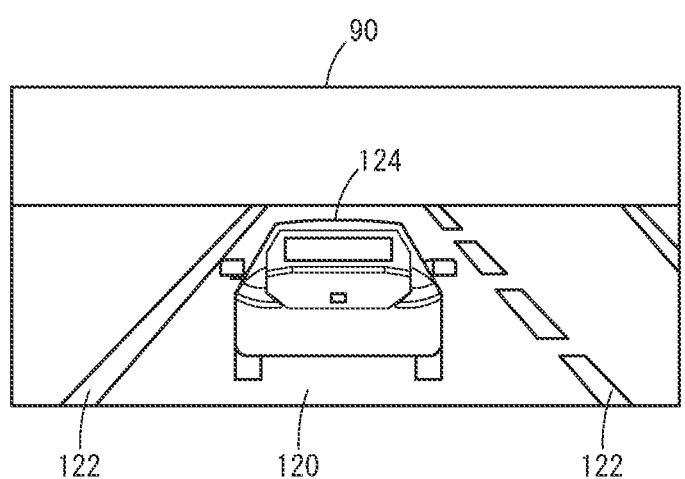

In step S6, the collision mitigation brake function is inspected. In the inspection of the collision mitigation brake function, the simulator device 80 reproduces the virtual external environment showing a scene where the preceding vehicle 124 suddenly stops (FIG. 6C). The simulator calculation device 82 reproduces the scene where the preceding vehicle 124 suddenly stops on the basis of the virtual external environment information 88, and causes the monitor device 90 to display the image of the reproduced scene. As illustrated in FIG. 6C, the monitor device 90 displays, as the virtual external environment, the preceding vehicle 124 that stops suddenly ahead of the vehicle 200, that is, the preceding vehicle 124 that rapidly approaches the vehicle 200, together with the driving lane 120. The camera 204 of the vehicle 200 photographs the image displayed on the monitor device 90.

The simulator calculation device 82 controls the operation of the electric motor 106 such that the position of the target 102 coincides with the position of the preceding vehicle 124 in the virtual external environment information 88. The electric motor 106 of the target device 100 operates with electric power output from the simulator input/output device 86, and causes the target 102 to rapidly approach the vehicle 200. The radar 206 and the LiDAR 208 of the vehicle 200 detect the target 102.

In the inspection of the collision mitigation brake function, the operator does not perform the operation of the brake pedal. In addition, at this time, the convex part 72 is in contact with the jack-up point 224, whereby the vehicle 200 is supported and fixed in place. Thus, the relative position between the monitor device 90 and the camera 204 is held, and the camera 204 is always positioned face-to-face with the monitor device 90.

When the reproduction of the predetermined virtual external environment ends, the simulator device 80 outputs an end signal to the test bench control device 34. Upon the input of the end signal, the test bench input/output device 78 outputs the pilot signal to the roller unit 22. The height adjustment device 58 operates the solenoid valve in accordance with the pilot signal output from the test bench input/output device 78, and supplies the fluid to the cylinder 52. Then, the rollers 42 in the roller unit 22 go up and the vehicle 200 goes up. At this time, the convex part 72 of the movement restriction device 26 is separated from the jack-up point 224 of the vehicle 200. As a result, the movement restriction of the vehicle 200 in the vehicle width direction and the front-rear direction is canceled.

After the inspection ends, the analysis device 110 analyzes the data log. For example, the data indicating the operation model of the vehicle 200 for the reproduced virtual external environment and the data log that is obtained actually are compared. If the difference between the both is within the allowable range, it is possible to determine that the external environment sensors 202, the vehicle control device 210, the driving device 212, the steering device 214, and the braking device 216 of the vehicle 200 are normal.

2. Second Embodiment

In the first embodiment, the movement of the vehicle 200 in the vehicle width direction is restricted by moving down the front wheel 220f by the roller unit 22 and bringing the convex part 72 of the movement restricting device 26 in contact with the jack-up point 224 of the vehicle 200. Instead of moving down the front wheel 220f, the convex part 72 may be fitted into a concave part 226 provided to the vehicle 200. As a second embodiment, the vehicle inspection system 10 including the movement restriction device 26 capable of causing the convex part 72 to be fitted into the concave part 226 of the vehicle 200 will be described.

The entire structure of the vehicle inspection system 10 according to the second embodiment is the same as the vehicle inspection system 10 according to the first embodiment illustrated in FIG. 2. Therefore, the description of the same structure is omitted.

Figure 7:
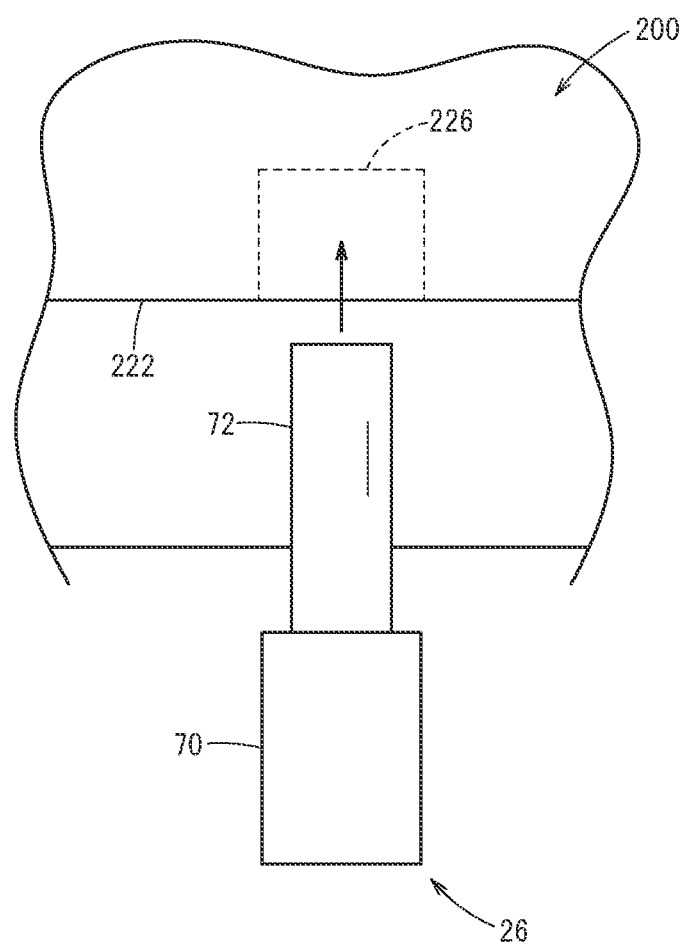
FIG. 7 is a diagram for describing a movement restriction device used in a second embodiment.

As illustrated in FIG. 7, a part of the bottom surface 222 of the vehicle 200 is not covered with an undercover (not illustrated) and this part includes the concave part 226 that is depressed from a surface of the undercover. As the convex part 72 goes up, the convex part 72 is fitted into the concave part 226.

3. Third Embodiment

In the first embodiment and the second embodiment, the vehicle 200 is fixed mechanically on the bench test machine 20, so that each wheel 220 is held in a manner of being placed at the center of each roller 42 in the axial direction (vehicle width direction). Instead, each wheel 220 may be held in a manner of being placed at the center of each roller 42 in the axial direction (vehicle width direction) by controlling the turning operation of the rollers 42 (turning table 68).

When the wheel 220 is displaced to the left or right from the center of each roller 42 in the axial direction (vehicle width direction) in the inspection, the center line of the vehicle 200 is displaced to the left or right from the center position of the bench test machine 20. The displacement of the vehicle 200 in the left-right direction is referred to as lateral displacement. The lateral displacement occurs when the front wheel 220f receives the force in the left-right direction from the rollers 42 (turning table 68). This force is generated when the steering angle θs of the front wheel 220f and the turning angle θt of the rollers 42 (turning table 68) are displaced. This force is also generated after the front wheel 220f starts to be steered, that is, the EPS actuator starts to operate in accordance with a steering instruction and before the steering angle θs of the front wheel 220f actually starts to change. In the first embodiment, the test bench calculation device 74 converts the rotation position θp detected by the rotation sensor 61 into the turning angle θt and performs the feedback control of the turning motor 60 so that the turning angle θt follows the steering angle θs detected by the wheel position sensor 30. By this feedback control, the lateral displacement due to the displacement between the steering angle θs and the turning angle θt can be reduced. This feedback control, however, cannot deal with the lateral displacement that occurs when the steering of the front wheel 220f is started.

In order to address the above situation, the test bench calculation device 74 according to the third embodiment controls the turning operation of the roller unit 22 by a double feedback method. Specifically, the test bench calculation device 74 controls the turning operation of the rollers 42 (turning table 68) on the basis of the distance d (steering angle θs) detected by the wheel position sensor 30 and the distance D (position in vehicle width direction) detected by the vehicle position sensor 32. One example of the embodiment is described below. Note that the steering angle θs is positive in a direction to one of the left and right sides from zero degrees, and negative in the other direction. This applies to the turning angle θt similarly. The distance D is positive in a direction to one of the left and right sides from the distance Ds, and negative in the other direction.

The test bench storage device 76 stores information indicating the relation between the difference between the distance D and the distance Ds and the turning quantity of the turning motor 60 that can make the difference zero.

The test bench calculation device 74 calculates the steering angle θs by correcting the distance d detected by the wheel position sensor 30 using the lateral displacement quantity of the vehicle 200 (distance D detected by the vehicle position sensor 32). Then, on the basis of the rotation position θp detected by the rotation sensor 61, the test bench calculation device 74 calculates the turning angle θt of the rollers 42 at that time, and controls the turning motor 60 so that the turning angle θt becomes closer to the steering angle θs. In addition, the test bench calculation device 74 controls the turning motor 60 so that the distance D detected by the vehicle position sensor 32 becomes closer to the distance Ds. In this manner, the test bench calculation device 74 performs the feedback control of the distance d (steering angle θs) and the feedback control of the distance D. In the feedback control of the distance D, the test bench calculation device 74 controls the turning motor 60 so that, when the vehicle 200 is displaced laterally to the left, the rollers 42 are turned to the left and when the vehicle 200 is displaced laterally to the right, the rollers 42 are turned to the right.

With reference to FIG. 8, one example of the process in the third embodiment is described. In the third embodiment, the process in step S1, step S2, and step S4 to step S6 illustrated in FIG. 4 is performed. The process described below is performed in parallel to step S4 to step S6 illustrated in FIG. 4.

In step S11, the test bench calculation device 74 obtains the rotation quantity of the turning motor 60 necessary to make the difference between the steering angle θs of the front wheel 220f and the turning angle θt of the rollers 42 zero. The rotation quantity to be obtained here is referred to as a first rotation quantity. After step S11, the process advances to step S12.

In step S12, the test bench calculation device 74 obtains the rotation quantity of the turning motor 60 necessary to make the difference between the distance D and the distance Ds zero, by using the information stored in the test bench storage device 76. The rotation quantity obtained here is referred to as a second rotation quantity. After step S12, the process advances to step S13.

In step S13, the test bench calculation device 74 adds up the first rotation quantity obtained in step S11 and the second rotation quantity obtained in step S12, and thus obtains the rotation quantity of the turning motor 60. After step S13, the process advances to step S14.

In step S14, the test bench calculation device 74 supplies the electric power in accordance with the rotation quantity obtained in step S13 to the turning motor 60, and thus rotates the turning motor 60.

4. Modification of Each Embodiment

The vehicle 200 may be connected to a data reader (not illustrated). The data reader can display on the screen the content of the operation instruction from the vehicle control device 210 and the detection information from the external environment sensors 202. The detection information from the external environment sensors 202 and the operation instruction information from the vehicle control device 210 can be inspected by the data reader.

As described above, the vehicle 200 may be an automated driving vehicle. In this case, the simulator device 80 transmits a quasi-signal indicating the positional information of the vehicle 200 in the virtual external environment to the GNSS receiver in the vehicle 200.

The function other than the lane keeping function, the inter-vehicle distance maintenance function, and the collision mitigation brake function described above can also be inspected. For example, a function of preventing departure from a road or an anti-lock brake function can also be inspected.

In each inspection, the torque motor 44 may apply a load according to the virtual external environment to the front wheel 220f, which is the driving wheel, in order to make the travel state closer to the actual travel state. In addition, when an upper end of the convex part 72 and the jack-up point 224 are in contact and the convex part 72 supports a part of the weight of the vehicle 200, the pressing force between the front wheel 220f and the rollers 42 decreases and in the worst case, the front wheel 220f slips. In order to prevent the front wheel 220f from slipping, the torque motor 44 may apply a load to the front wheel 220f.

In the above embodiments, the bench test machine 20 for inspecting the vehicle 200 whose front wheel 220f is the driving wheel has been described. On the other hand, in a case of inspecting the vehicle 200 whose rear wheel 220r is the driving wheel, the vehicle speed sensor 28 detects the rotation speed r1 of any of the rollers 42 in the roller device 24 that supports the rear wheel 220r.

In the aforementioned embodiments, the front wheel 220f is moved to the center of the rollers 42 by turning the rollers 42, and thus the relative position between the camera 204 of the vehicle 200 and the monitor device 90 is kept constant. Alternatively, the roller unit 22 and the roller device 24 may slide in the vehicle width direction so that the displacement of the vehicle 200 is solved.

The display device may be a projector and a screen instead of the monitor device 90.

5. Technical Concept Obtained from Embodiments

The technical concept that is obtained from the above embodiments and the modifications is hereinafter described.

The first aspect of the present invention is the vehicle inspection system 10 configured to inspect the operation of the vehicle 200 that performs the travel control on the basis of the external environment information detected by the camera 204, the vehicle inspection system 10 including: the bench test machine 20 configured to rotatably support the wheels 220 of the vehicle 200 by the rollers 42 provided for each wheel 220; and the monitor device (display device) 90 disposed at the fixed position with respect to the bench test machine 20, and configured to display the image simulating the external environment toward the camera 204, wherein the bench test machine 20 includes the position adjustment device (turning mechanism 40, test bench control device 34) configured to adjust the position of the vehicle 200 in the vehicle width direction so that the relative position of the camera 204 relative to the monitor device 90 in the vehicle width direction becomes constant.

With the above configuration, the position of the vehicle 200 in the vehicle width direction can be adjusted by the position adjustment device (turning mechanism 40, test bench control device 34). Therefore, the vehicle 200 can be positioned at a constant position on the bench test machine 20.

With the above configuration, the relative position of the camera 204 in the vehicle width direction relative to the monitor device 90 can be made constant. Therefore, a constant portion of the screen of the monitor device 90 can be photographed by the camera 204.

In the first aspect, the position adjustment device (turning mechanism 40, test bench control device 34) may cause the reaction force to occur in the steered wheel (front wheel 220f) among the wheels 220 by turning the rollers 42 that support the steered wheel, alternately in the positive direction and the negative direction around the turning axis T that is parallel to the up and down direction, and thereby move the vehicle 200 in the vehicle width direction.

With the above configuration, the rollers 42 are turned, more specifically turned alternately in the positive direction and the negative direction, whereby the steered wheel (front wheel 220f) can be moved to the center of the rollers 42. In addition, the vehicle 200 can be moved in the vehicle width direction in accordance with the movement of the steered wheel.

In the first aspect of the present invention, the bench test machine 20 may include the movement restriction device 26 configured to restrict the movement of the vehicle 200 in the vehicle width direction.

When the vehicle 200 travels on the bench test machine 20, there are cases that the vehicle 200 may deviate in the vehicle width direction. With the above configuration, even if the vehicle 200 is caused to travel on the bench test machine 20, it is possible to keep the vehicle 200 at a given position on the bench test machine 20.

In the first aspect of the present invention, the movement restriction device 26 may keep the position of the vehicle 200 so that the relative position of the camera 204 relative to the monitor device 90 in the vehicle width direction becomes constant.

In the first aspect of the present invention, the movement restriction device 26 may include the convex part 72 configured to make contact with the bottom surface 222 of the vehicle 200.

In the first aspect of the present invention, the vehicle inspection device may further include the wheel position sensor 30 configured to detect the steering angle $\theta s$ of the steered wheel (front wheel 220f), and the vehicle position sensor 32 configured to detect the position of the vehicle 200 in the vehicle width direction (distance D), and the position adjustment device (turning mechanism 40, test bench control device 34) may control the turning operation of the rollers 42 on the basis of the detection results from the wheel position sensor 30 and the vehicle position sensor 32.

In the above structure, the turning operation of the rollers 42 is controlled on the basis of the steering angle $\theta s$ of the steered wheel (front wheel 220f) and the position of the vehicle 200 in the vehicle width direction. With the above configuration, the lateral displacement of the vehicle 200 due to the difference between the steering angle $\theta s$ of the steered wheel and the turning angle $\theta t$ of the rollers 42 can be prevented, and moreover the lateral displacement of the vehicle 200 that occurs at the start of the steering can be prevented. As a result, during the inspection, the steered wheel can be held at substantially the center of the rollers 42, and the center line of the vehicle 200 can be kept on the center line of the bench test machine 20.

The second aspect of the present invention is the vehicle inspection method for inspecting the operation of the vehicle 200 that performs the travel control on the basis of the external environment information detected by the camera 204, the vehicle inspection method including: guiding the vehicle 200 to the bench test machine 20 including the rollers 42 (step S1); and with the position adjustment device (turning mechanism 40, test bench control device 34), turning or laterally moving the rollers 42 so that the relative position of the camera 204 relative to the monitor device (display device) 90 in the vehicle width direction becomes constant, in order to display the image simulating the external environment toward the camera 204, the display device being disposed at the fixed position with respect to the bench test machine 20 (step S2).

In the second aspect of the present invention, the wheel position sensor 30 configured to detect the steering angle $\theta s$ of the steered wheel (front wheel 220f) and the vehicle position sensor 32 configured to detect the position of the vehicle 200 in the vehicle width direction (distance D) may be provided, and the position adjustment device (turning mechanism 40, test bench control device 34) may control the turning operation of the rollers 42 on the basis of the detection results from the wheel position sensor 30 and the vehicle position sensor 32.

Note that the vehicle inspection system and the vehicle inspection method according to the present invention are not limited to the aforementioned embodiments, and various configurations can be employed without departing from the essence and gist of the present invention.

The invention claimed is:

1. A vehicle inspection system configured to inspect operation of a vehicle that performs travel control on a basis of external environment information detected by a camera, the vehicle inspection system comprising:
   a bench test machine configured to rotatably support wheels of the vehicle by rollers provided for each wheel; and
   a display device disposed at a fixed position with respect to the bench test machine, and configured to display an image simulating an external environment toward the camera,
   wherein the bench test machine includes a position adjustment device configured to adjust a position of the vehicle in a vehicle width direction so that a relative position of the camera relative to the display device in the vehicle width direction becomes constant, and
   the position adjustment device is configured to cause a reaction force to occur in a steered wheel of the wheels by turning the rollers that support the steered wheel, alternately in a positive direction and a negative direction around a turning axis that is parallel to an up and down direction, and thereby move the vehicle in the vehicle width direction.

2. The vehicle inspection system according to claim 1, wherein the bench test machine includes a movement restriction device configured to restrict movement of the vehicle in the vehicle width direction.

3. The vehicle inspection system according to claim 2, wherein the movement restriction device maintains the position of the vehicle so that the relative position of the camera relative to the display device in the vehicle width direction becomes constant.

4. The vehicle inspection system according to claim 2, wherein the movement restriction device includes a convex part configured to make contact with a bottom surface of the vehicle.

5. The vehicle inspection system according to claim 1, further comprising:
   a wheel position sensor configured to detect a steering angle of the steered wheel; and
   a vehicle position sensor configured to detect the position of the vehicle in the vehicle width direction,
   wherein the position adjustment device is configured to control turning operation of the rollers, based on detection results from the wheel position sensor and the vehicle position sensor.

6. A vehicle inspection method for inspecting operation of a vehicle that performs travel control on a basis of external environment information detected by a camera, the vehicle inspection method comprising:
   guiding the vehicle to a bench test machine including rollers; and
   with a position adjustment device, cause a reaction force to occur in a steered wheel of the vehicle by turning the rollers that support the steered wheel, alternately in a positive direction and a negative direction around a turning axis that is parallel to an up and down direction, and thereby move the vehicle laterally so that a relative position of the camera relative to a display device in a vehicle width direction becomes constant, in order to display an image simulating an external environment toward the camera, the display device being disposed at a fixed position with respect to the bench test machine.

7. The vehicle inspection method according to claim 6, wherein:
   a wheel position sensor configured to detect a steering angle of the steered wheel and a vehicle position sensor configured to detect a position of the vehicle in the vehicle width direction are provided; and
   the position adjustment device is configured to control turning operation of the rollers, based on detection results from the wheel position sensor and the vehicle position sensor.

* * * * *